(12) United States Patent
Kitada et al.

(10) Patent No.: US 8,603,283 B2
(45) Date of Patent: Dec. 10, 2013

(54) METHOD AND SYSTEM FOR MANUFACTURING OPTICAL DISPLAY DEVICE

(75) Inventors: Kazuo Kitada, Ibaraki (JP); Satoru Koshio, Ibaraki (JP); Takuya Nakazono, Ibaraki (JP); Tomokazu Yura, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 12 days.

(21) Appl. No.: 12/746,083

(22) PCT Filed: Dec. 4, 2008

(86) PCT No.: PCT/JP2008/072089
§ 371 (c)(1),
(2), (4) Date: Jun. 3, 2010

(87) PCT Pub. No.: WO2009/075224
PCT Pub. Date: Jun. 18, 2009

(65) Prior Publication Data
US 2010/0276078 A1   Nov. 4, 2010

(30) Foreign Application Priority Data

Dec. 11, 2007 (JP) .................. 2007-319828
Dec. 2, 2008 (JP) .................. 2008-307725

(51) Int. Cl.
*B29C 65/48* (2006.01)
*B32B 37/26* (2006.01)
*B32B 38/10* (2006.01)

(52) U.S. Cl.
USPC .................. 156/249; 156/281; 156/289

(58) Field of Classification Search
USPC .................. 156/247, 281, 289, 249
See application file for complete search history.

(56) References Cited

U.S. PATENT DOCUMENTS

| | | | |
|---|---|---|---|
| 7,022,204 B2 | 4/2006 | Kanbara et al. | |
| 7,543,621 B2 | 6/2009 | Kanbara et al. | |
| 8,182,637 B2 | 5/2012 | Nakahira et al. | |
| 2005/0016670 A1 | 1/2005 | Kanbara et al. | |
| 2005/0100820 A1 | 5/2005 | Satake et al. | |

(Continued)

FOREIGN PATENT DOCUMENTS

| | | |
|---|---|---|
| JP | 57-052017 A | 3/1982 |
| JP | 10-199422 A | 7/1998 |

(Continued)

OTHER PUBLICATIONS

Notification of Transmittal of Translation of the International Preliminary Report on Patentability (Form PCT/IB/338 of International Application No. PCT/JP2008/072089 mailed Aug. 19, 2010 with Forms PCT/IB/373 and PCT/ISA/237.

(Continued)

*Primary Examiner* — Sing P Chan
(74) *Attorney, Agent, or Firm* — Westerman, Hattori, Daniels & Adrian, LLP

(57) ABSTRACT

It is provided that a method and a system for manufacturing an optical display device, which make it possible to bond an optical member and an optical display unit together with a certain degree of cleanliness maintained. The method for manufacturing an optical display device including an optical display unit (W) and an optical member (11, 12) bonded to the optical display unit (W), which includes a bonding step for bonding the optical member (11, 12) to the optical display unit (W) in an environment with an airflow.

4 Claims, 8 Drawing Sheets

(56) References Cited

U.S. PATENT DOCUMENTS

| | | |
|---|---|---|
| 2006/0124248 A1 | 6/2006 | Kanbara et al. |
| 2009/0159175 A1 | 6/2009 | Nakahira et al. |
| 2009/0218049 A1 | 9/2009 | Kanbara et al. |
| 2010/0276078 A1 | 11/2010 | Kitada et al. |
| 2010/0288432 A1 | 11/2010 | Kitada et al. |
| 2011/0061801 A1 | 3/2011 | Kitada et al. |
| 2012/0097316 A1 | 4/2012 | Nakahira et al. |

FOREIGN PATENT DOCUMENTS

| | | |
|---|---|---|
| JP | 2001-282126 A | 10/2001 |
| JP | 2002-127250 A | 5/2002 |
| JP | 2005-037416 A | 2/2005 |
| JP | 2005-125659 A | 5/2005 |
| JP | 2005-306604 A | 11/2005 |
| JP | 2005-321582 A | 11/2005 |
| JP | 2007-140046 A | 6/2007 |
| JP | 2007-293588 A | 11/2007 |
| JP | 2007-317759 A | 12/2007 |
| JP | 2008-307725 A | 12/2008 |
| JP | 2009-163225 A | 7/2009 |
| JP | 2009-186987 A | 8/2009 |
| JP | 2009-186994 A | 8/2009 |
| JP | 4588783 B2 | 12/2010 |
| WO | 2009/087870 A1 | 7/2009 |
| WO | 2009/087895 A1 | 7/2009 |

OTHER PUBLICATIONS

Japanese Office Action dated Jun. 9, 2010, issued in corresponding Japanese Patent Application No. 2008-307725.
Japanese Office Action dated Oct. 4, 2011 issued in corresponding Japanese Patent Application No. 2010-200080.
Chinese Office Action dated Jan. 11, 2012, issued in corresponding Chinese Patent Application No. 200880119279.8.
Japanese Office Action dated Jul. 5, 2012, issued in corresponding Japanese Patent Application No. 2010-200080.
Chinese Office Action dated Dec. 7, 2012, issued in corresponding Chinese Patent Application No. 200880119279.8, with English translation (9 pages).
English abstract and Machine translation of JP2002-127250 (8 pages).
Taiwanese Office Action dated Mar. 6, 2013, issued in corresponding Taiwanese Patent Application No. 097147855, with English translation (9 pages).
International Search Report of PCT/JP2008/072089, Mailing Date of Jan. 27, 2009.

Fig.11
Example of manufacturing process
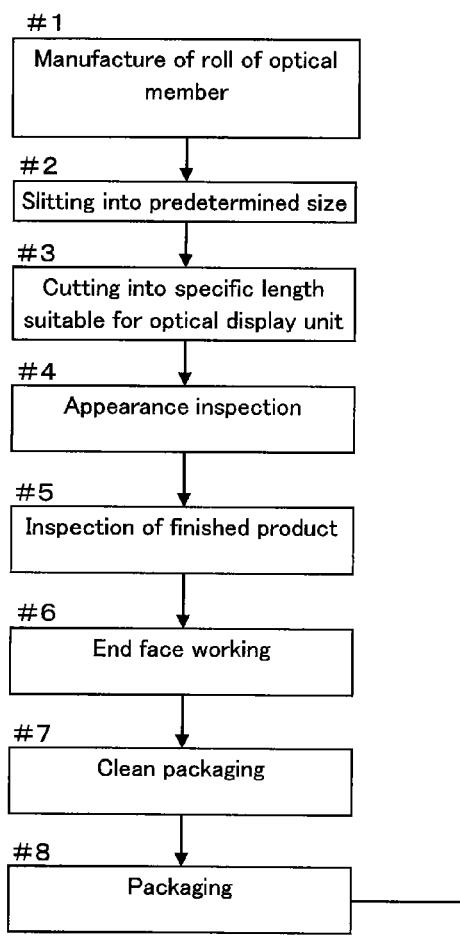
Example of manufacturing process in panel processing manufacturer
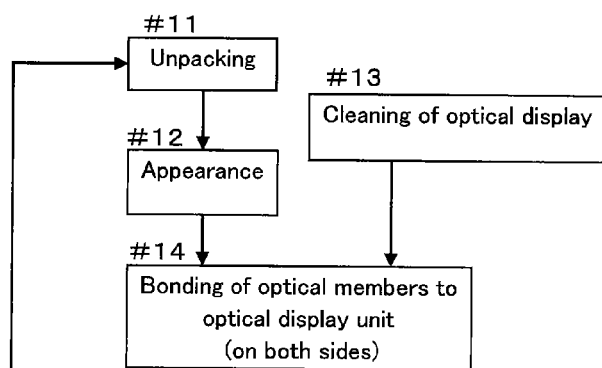

METHOD AND SYSTEM FOR MANUFACTURING OPTICAL DISPLAY DEVICE

TECHNICAL FIELD

The invention relates to a method and a system for manufacturing an optical display device including an optical display unit and an optical member bonded to the optical display unit.

BACKGROUND ART

FIG. 11 schematically shows a conventional method for manufacturing an optical display device (liquid crystal display). First, an optical member manufacturer produces a long sheet material, which includes an optical member, in the form of a roll (#1), and it is slit into a predetermined size (#2). Examples of the optical member include a polarizing plate for use in a liquid crystal display, a laminated film including a polarizing plate and a retardation plate, and so on. The slit piece of the long material is then cut into a specific length according to the size of an optical display unit (liquid crystal cell) (#3), and the specific-length piece of the sheet material is subjected to an appearance inspection (#4). The finished product is then inspected (#5). Subsequently, the four end faces of the piece of the sheet material are worked (#6). The piece of the sheet material is then subjected to clean packaging in a clean room environment (#7), and packaging for transportation is performed (#8). The piece of the sheet material manufactured as described above is transported to a panel processing manufacturer.

The panel processing manufacturer unpacks the piece of the sheet material (#11). An appearance inspection is then performed to check whether scratches, stains or other defects are produced in transit or during unpacking (#12). The piece of the sheet material determined as non-defective in the inspection is then transferred to the next step. An optical display unit (liquid crystal cell) to which the piece of the sheet material will be bonded is previously manufactured and cleaned before the bonding step (#13).

The piece of the sheet material and the optical display unit (liquid crystal cell) are bonded together to form an optical display device (#14). The release film is peeled off from the piece of the sheet material so that the pressure-sensitive adhesive can be left, and one side of the optical display unit (liquid crystal cell) is bonded to the surface of the pressure-sensitive adhesive. The other side of the optical display unit (liquid crystal cell) may also be bonded in a similar manner.

Japanese Patent Application Laid-Open (JP-A) No. 2007-140046 (Patent Literature 1) discloses a manufacturing method, which includes: feeding a sheet material, which includes an optical member, from a roll thereof; detecting whether the sheet material has any defect; cutting the sheet material into pieces based on the result of the detection; subsequently peeling off the release film; and then bonding the cut piece of the optical member to a liquid crystal cell.

JP-A No. 2005-37416 (Patent Literature 2) discloses a manufacturing method, which includes cutting the members (e.g., a polarizing plate) of a sheet material other than a release film so that the sheet material can be kept continuous by means of the release film and bonding the cut piece of the sheet material to an optical display unit (liquid crystal cell) with the pressure-sensitive adhesive interposed therebetween, while peeling off the release film.

Patent Literature 1: Japanese Patent Application Laid-Open (JP-A) No. 2007-140046.

Patent Literature 2: JP-A No. 2005-37416.

DISCLOSURE OF INVENTION

Problems to be Solved by the Invention

In the case disclosed in Patent Literature 1 or 2, the surfaces of the optical member and the optical display unit to be bonded together may be contaminated with foreign matter such as dust or dirt falling from the ceiling, so that the surfaces to be bonded together sometimes cannot have a sufficient degree of cleanliness in the process of bonding the optical member and the optical display unit together.

The invention has been made in view of the above circumstances, and an object of the invention is to provide a method and a system for manufacturing an optical display device, which make it possible to bond an optical member and an optical display unit together with a certain degree of cleanliness maintained.

Means for Solving the Problems

As a result of investigations to solve the above problems, the invention has been accomplished.

An embodiment of the invention is directed to a method for manufacturing an optical display device including an optical display unit and an optical member bonded to the optical display unit, which includes:

a bonding step for bonding the optical member to the optical display unit in an environment with an airflow.

According to this feature, the environment with an airflow makes it possible to bond the optical member to the optical display unit in such a state that the cleanliness of the surface of the optical display unit and the surface of the optical member to be bonded is kept high. Therefore, the surfaces to be bonded are well prevented from being contaminated with foreign matter, so that an optical display device of high quality can be manufactured.

In a preferred embodiment of the invention, the airflow in the environment is comprised of an ionized gas at least a position where the optical member is bonded to the optical display unit, and the airflow of the ionized gas flows on the optical display unit that is fed while being in contact with feed means before and/or during the bonding step.

Feed means for feeding the optical display unit may be broadly classified into a contact type such as feed rollers and a non-contact type such as an air conveyer. The contact type is advantageous in that it is relatively inexpensive and can ensure satisfactory bonding accuracy. When the contact type is used, however, the optical display unit may be electrostatically charged by the friction between the optical display unit and the feed means. The static electricity generated by the electrostatic charge may facilitate the deposition of dust or dirt onto the surface of the optical display unit to be bonded or cause electrostatic destruction of the optical display unit. Thus, the airflow in the environment is comprised of an ionized gas at least a position where the optical member is bonded to the optical display unit, while the optical display unit is fed in contact with the feed means before and/or during the bonding step, so that static electricity can be removed from the optical display unit by the action of the airflow of the ionized gas on the charged optical display unit. Thus, the deposition of dust or dirt onto the surface of the optical display unit to be bonded and the electrostatic destruction of the optical display unit can be prevented well.

For example, the contact-type feed means that functions to feed the optical display unit while being in contact therewith may be, but not limited to, a plurality of feed rollers and rotary driving means therefor, vacuum suction means, or feed means with a plurality of lifting claws. In view of cost, however, a plurality of feed rollers and rotary driving means therefor are preferred.

For example, means for ionizing gas may be, not limited to, an ionizer. The ion generation method for the ionizer may be an AC method (in which an AC voltage is applied to the discharge needle so that cations and anions are alternately generated) or a DC method (in which a DC voltage is applied to the discharge needle so that only cations or anions are generated).

In a preferred embodiment of the invention, the bonding step is the step for bonding a surface of the optical member to be bonded to the optical display unit while peeling off a release film from a sheet material that includes the optical member and the release film bonded thereto, wherein the surface of the optical member to be bonded is exposed by peeling off the release film from the sheet material.

According to this feature, the surface of the optical member to be bonded is not exposed until immediately before the bonding, and the exposed surface can be bonded immediately, so that the deposition of foreign matter onto the surface of the optical member to be bonded can be prevented well. In addition, when the airflow supplied to at least the position where the optical member is bonded to the optical display unit includes ionized gas, the electrostatic destruction of the optical display unit caused by electrostatic charge upon peeling off of the release film can be prevented well.

In a preferred embodiment of the invention, the bonding step is the step for bonding the optical member to an optical display unit surface brought into contact with the feed means earlier than to another optical display unit surface not brought into contact with the feed means.

When foreign matter (dust or dirt) falling from the ceiling (above) is deposited on the opposite side (typically upper side) of the optical display unit from the side brought into contact with the feed means, such foreign matter can be blown off by the action of the airflow. However, foreign matter deposited on the feed means-contact sides (typically lower side) of the optical display unit and feed means (for example, the surface of feed roller) sometimes cannot easily be blown off only by the action of the airflow. For example, the airflow from the upper side may fail to sufficiently act on the lower surface of the optical display unit and the surface of feed rollers, in contrast to the upper surface of the optical display unit. When the optical display unit is fed in contact with the feed means as described above, the longer time of contact between the optical display unit and the feed means increases the chances of transfer of foreign matter from the feed means to the surface of the optical display unit brought into contact with the feed means. Thus, when the optical member is bonded to the optical display unit surface brought into contact with the feed means earlier than to the optical display unit surface not brought into contact with the feed means, the time of contact between the optical display unit and the feed means can be reduced, which can reduce the chances of deposition of foreign matter onto the optical display unit surface brought into contact with the feed means.

In addition, when the feed means used includes feed rollers, the optical member can be bonded, at an early stage, to the optical display unit surface brought into contact with the feed rollers, so that the time of direct contact between the optical display unit surface and the feed rollers can be reduced. As a result, the electrostatic charge of the optical display unit caused by the friction between the optical display unit and the feed rollers can be suppressed, so that electrostatic destruction can be prevented well.

Another embodiment of the invention is directed to a system for manufacturing an optical display device including an optical display unit and an optical member bonded to the optical display unit, which includes:

a bonding apparatus for bonding the optical member to the optical display unit; and an air blower for providing an airflow in a space containing the bonding apparatus.

In this system, an airflow is provided in a space containing the bonding apparatus, so that the optical member can be bonded to the optical display unit in such a state that the cleanliness of the surface of the optical display unit and the surface of the optical member to be bonded is kept high. Therefore, the surfaces to be bonded are well prevented from being contaminated with foreign matter, so that an optical display device of high quality can be manufactured.

The manufacturing system preferably further includes:

feed means for feeding the optical display unit while coming into contact with it; and ionization means for making the airflow contain ionized gas, wherein the airflow of the ionized gas produced by the ionization means is flowed on the optical display unit being fed in contact with the feed means. This feature is effective and advantageous as described above.

In the manufacturing system, the bonding apparatus preferably includes: peeling means for peeling off a release film from a sheet material including the optical member and the release film bonded thereto; and a pair of elastic rollers with which the portion of the optical member exposed by the peeling off of the release film is pressed against and bonded to the optical display unit, while the release film is peeled off by the peeling means. This feature is effective and advantageous as described above.

The manufacturing system preferably further includes:

a first bonding apparatus configured to bond an optical member to the optical display unit surface brought into contact with the feed means; and a second bonding apparatus configured to bond an optical member to the optical display unit surface not brought into contact with the feed means, wherein the first bonding apparatus is first used for bonding, and the second bonding apparatus is then used for bonding. This feature is effective and advantageous as described above.

In an embodiment of the invention, an isolation structure for isolating a space around the bonding apparatus from the outside is preferably provided so that a certain degree of cleanliness can be maintained during the bonding. The whole of the manufacturing system preferably has an isolation structure. The isolation structure is preferably, but not limited to, a transparent plastic panel, which allows visual observation from the outside. A freely openable and closable aperture and feed path are preferably provided at appropriate places in view of the maintenance of each part of the apparatus, the placement of a material roll, the need for an inlet and an outlet for the feeding of the optical display unit, workability, and so on.

The air blower is preferably placed on the ceiling side of the isolation structure, and an air ventilation hole is preferably formed on the floor side or the lower portion of the wall surface of the isolation structure with a filter interposed therebetween so that the airflow can flow out of the floor side or the lower portion of the wall of the isolation structure. The airflow from the air blower may also be circulated from the air ventilation hole through a given pipe. The air blower may be any known clean air generator. For example, HEPA filter-containing equipment is preferably used as the air blower. When the isolation structure and the air blower are used, the manufacturing system can be kept clean with no need to make the whole of the manufacturing place have a clean room structure, which is highly advantageous in terms of cost. The ionization means (such as an ionizer) is preferably structured so that ionized gas produced by the ionization means can be carried on clean air from the air blower and that the airflow of the ionized gas can be provided to act on the optical display unit, while it may be placed in the interior of the air blower.

The first and second bonding apparatuses may be placed in the interior of the isolation structure, and the airflow of the ionized gas may be provided to act in a space around each of the first and second bonding apparatuses, so that the clean environment can be maintained and that the electrostatic charge of the optical display unit can be eliminated well.

In an embodiment of the invention, for example, the optical display device may be a liquid crystal display or an organic EL display. The liquid crystal display may include a liquid crystal cell as the optical display unit. The organic EL display may include an organic EL cell as the optical display unit.

In an embodiment of the invention, the term "defect" typically means fouling of the surface or the inside, scratches, a foreign substance-containing defect with a special shape such as a dented and twisted shape (also called "knick"), bubbles, foreign substances, and so on.

BRIEF DESCRIPTION OF DRAWINGS

FIG. 11 is a flow chart of a conventional method for manufacturing an optical display device.

DESCRIPTION OF REFERENCE CHARACTERS

Figure 1:
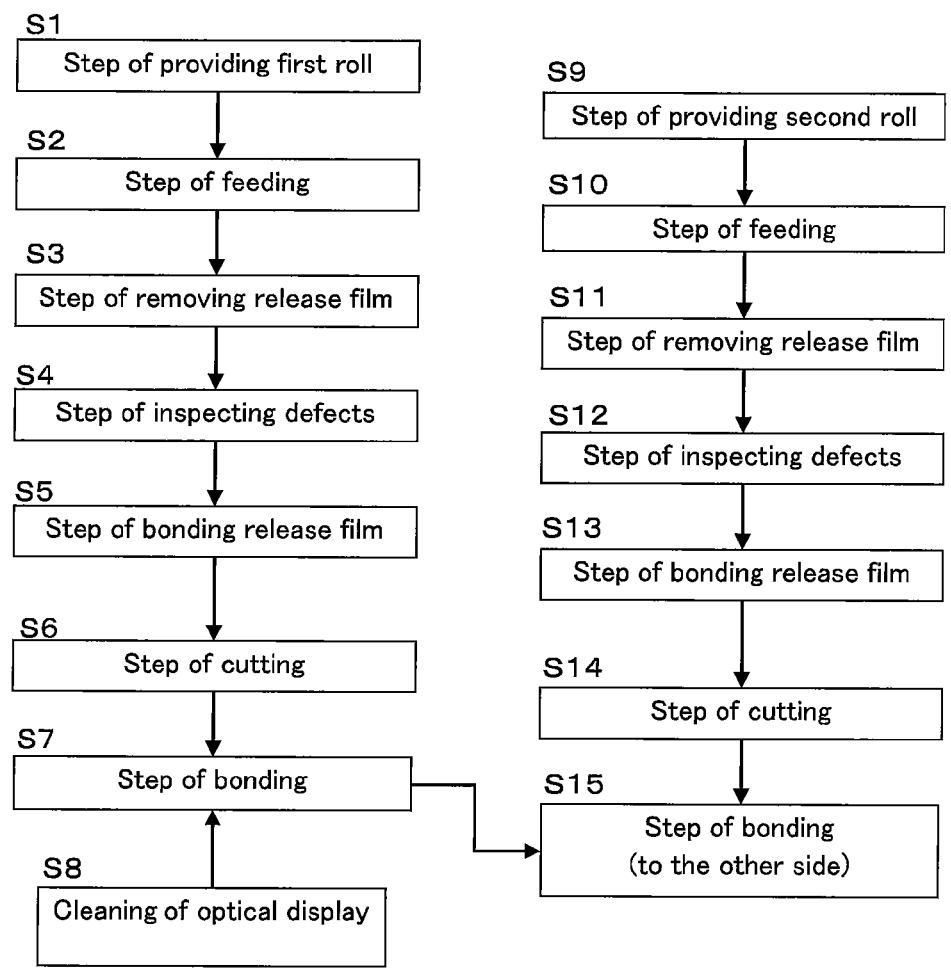
FIG. 1 is a flow chart of the method of Embodiment 1 for manufacturing an optical display device.

In the drawings, reference character 1 represents a first sheet material, 2 a second sheet material, 11a first optical film, 11a a first polarizer, 11b a first film, 11c a second film, 12a first release film, 13a surface protecting member, 14a first pressure-sensitive adhesive layer, 15a weak pressure-sensitive adhesive layer, 18a first bonding apparatus, 19a first rejection apparatus, 21 a second optical film, 21a a second polarizer, 21b a third film, 21c a fourth film, 22a second release film, 23a surface protecting member, 24a second pressure-sensitive adhesive layer, 25a weak pressure-sensitive adhesive layer, 28a second bonding apparatus, 29a second rejection apparatus, 40 an air blower, 50 an isolation structure, 60 an ionizer, 102a first feeding apparatus, 103a first pre-inspection peeling apparatus, 104a first defect inspection apparatus, 105a first release film bonding apparatus, 106 a first cutting apparatus, 202a second feeding apparatus, 203 a second pre-inspection peeling apparatus, 204a second defect inspection apparatus, 205a second release film bonding apparatus, 206a second cutting apparatus, R feed means, W an optical display unit, and W12 an optical display device.

BEST MODE FOR CARRYING OUT THE INVENTION

The invention is more specifically described by referring to the following embodiments which are not intended to limit the scope of the invention.

Embodiment 1

Embodiment 1 of the invention is described below. FIG. 1 is a flow chart showing an example of the method of Embodiment 1 for manufacturing an optical display device. FIGS. 2 to 5 are diagrams showing an example of the main configuration of a system for manufacturing an optical display device in Embodiment 1. FIG. 6 is a schematic cross-sectional view showing an example of the optical display device having a bonded optical member.

Optical Member and Sheet Material

The optical member to be bonded to the optical display unit is typically a polarizer film, a retardation film, a viewing angle compensation film, a brightness enhancement film or the like, or a laminated film of a combination of two or more thereof. A transparent protecting film may be placed on one or both sides of any of these optical members. Although the structure of a first sheet material 1 is described below, a second sheet material 2 has the same structure. It will be understood that the first and second sheet materials 1 and 2 may have different structures.

As shown in FIG. 6, the first sheet material 1 has a laminated structure including a first optical member 11, a release film 12 and a surface protecting member 13. The first optical member 11 includes a first polarizer 11a, a first polarizer-protecting film 11b provided on one side thereof with an adhesive layer (not shown) interposed therebetween, and a second polarizer-protecting film 11c provided on the other side thereof with an adhesive layer (not shown) interposed therebetween. Hereinafter, a laminated structure including a polarizer and a polarizer protecting film(s) is also referred to as a polarizing plate. A laminated structure including an optical member, and a surface protecting member and a release film which are placed on the optical member is also called a sheet material.

For example, the first and second polarizer-protecting films 11b and 11c may each be a triacetylcellulose (TAC) film or a polyethylene terephthalate (PET) film. The surface protecting member 13 is provided on the first polarizer-protecting film 11b with a weak pressure-sensitive adhesive layer 15 interposed therebetween. The release film 12 is provided on the second polarizer-protecting film 11c with a pressure-sensitive adhesive layer 14 interposed therebetween. The first and second polarizer-protecting films 11b and 11c each typically include, but are not limited to, a film made of a thermoplastic resin with a high level of transparency, mechanical strength, thermal stability, moisture blocking properties, isotropy, or the like. Examples of such a thermoplastic resin include cellulose resins such as triacetylcellulose, polyester resins, polyethersulfone resins, polysulfone resins, polycarbonate resins, polyamide resins, polyimide resins, polyolefin resins, (meth) acrylic resins, cyclic polyolefin resins (norbornene resins), polyarylate resins, polystyrene resins, polyvinyl alcohol resins, and any mixture thereof.

For practical use, the optical member 11 may typically be an optical film having a multilayered structure in which various optical layers are laminated. Examples of such optical layers include, but are not limited to, layers formed by performing hard coating treatment, antireflection treatment, or surface treatment for anti-sticking, diffusion or antiglare purpose on the polarizer-protecting film surface to which no polarizer will be bonded (the surface on which the adhesive coating layer is not provided), and oriented liquid crystal layers for viewing angle compensation or other purposes. An optical film(s) for use in forming a liquid crystal display or the like, such as a reflector, a transflector, a retardation plate (including a wavelength plate (A plate) such as a half or quarter wavelength plate), or a viewing angle compensation film may also be used in the form of a layer or a laminate of two or more layers.

The first polarizer 11a typically includes a polyvinyl alcohol-based film.

The exposed surface of the first pressure-sensitive adhesive layer 14 may be temporarily covered with a release film 12 for antifouling or the like. This can prevent contact with the pressure-sensitive adhesive layer 14 during usual handling. The release film 12 to be used may be an appropriate conventional one such as an appropriate thin material including a plastic film, a rubber sheet, a paper sheet, a cloth, a nonwoven fabric, a net, a foam sheet, a metal foil, or a laminate thereof, which is optionally coated with any appropriate release agent such as a silicone, long-chain alkyl or fluoride release agent, or molybdenum sulfide.

The surface protecting member 13 is provided through the weak pressure-sensitive adhesive layer 15. The main purpose thereof is to prevent scratches, stains and so on. The surface protecting member to be used may be an appropriate conventional one such as an appropriate thin material including a plastic film, a rubber sheet, a paper sheet, a cloth, a nonwoven fabric, a net, a foam sheet, a metal foil, or a laminate thereof, which is optionally coated with any appropriate release agent such as a silicone, long-chain alkyl or fluoride release agent, or molybdenum sulfide.

The pressure-sensitive adhesive layer 14 and the weak pressure-sensitive adhesive layer 15 are provided for bonding to a liquid crystal cell or any other member. An acrylic pressure-sensitive adhesive or any other appropriate conventional pressure-sensitive adhesive may be used to form the pressure-sensitive adhesive layer 14 and the weak pressure-sensitive adhesive layer 15.

Method and System for Manufacturing Optical Display Device

Each step and operation of each apparatus described below are performed in an isolation structure 50 isolated from a factory environment. The isolation structure 50 includes transparent material walls and skeletal structures. Air blowers 40 are provided on the ceiling of the isolation structure 50. The air blower 40 has an HEPA filter and sends high-cleanliness air to the inside of the isolation structure 50 to form a clean airflow. Ionizers 60 are placed in the vicinity of first and second bonding apparatuses 18 and 28 and above optical display units W and W1 to ionize the clean air so that the airflow of an ionized gas is produced and sent. The air blowers 20 may be arranged to run in conjunction with or independently of the ionizers. Air discharge openings 50a for discharging air from the inside to the outside are provided in a lower portion of the wall of the isolation structure 50. In addition, a filter may be provided on each opening side to block invading substances from the outside. The isolation structure 50 and the air blower 40 make it possible to keep the environment for the whole of the manufacturing system clean and to satisfactorily prevent the incorporation of foreign substances from the outside. In addition, the isolation structure 50 isolates only the manufacturing system from the outside, so that there is no need to form the whole of the factory into a so-called clean room.

(1) Step of Providing First Material Roll (S1). A first roll of a first long sheet material is provided. The width of the first roll depends on the size of the optical display unit to be bonded.

(2) Feeding Step (S2). The first sheet material 1 is fed to the downstream side from the first roll provided and placed. For example, a first feeder 102 to feed the first sheet material 1 includes a pair of nip rollers, a tension roller, a rotary drive, an accumulator A, a sensor, a controller, and so on.

(3) Step of Removing Release Film (S3)

A first pre-inspection peeling apparatus 103 peels off the release film 12 from the first sheet material 1 being fed. The first pre-inspection peeling apparatus 103 includes: a peeling mechanism 131 having a knife edge portion with which the release film 12 is taken up and peeled off from the first sheet material 1 being fed; and a roll 132 on which the release film 12 being peeled off is wound.

(4) Step of Inspecting Defects (S4). After the step (S3) of removing the release film, the first sheet material 1 is inspected for defects using a first defect inspection apparatus 104. A defect inspection can be performed on the first optical member 11 without the need to take into account the inherent retardation of the release film 12. The defect inspection method may be a method of performing imaging and image processing on both sides of the first sheet material 1 with transmitted light or reflected light, a method of performing imaging and image processing with a polarizing film for inspection arranged in crossed Nicol relation (also referred to as "0° cross") with the polarization axis of the polarizing plate (the object to be inspected) between a CCD camera and the object, or a method of performing imaging and image processing with a polarizing film for inspection arranged at a certain angle (for example, in the range of more than 0° to 10°, also referred to as "X° cross") with the polarization axis of the polarizing plate (the object to be inspected) between a CCD camera and the object.

Defect information detected by the first defect inspection apparatus 104 is associated with the positional information (such as position coordinates) and sent to a controller so that it can contribute to the cutting process with a first cutting apparatus 106 as described below.

The system is configured so that the first sheet material 1 containing any defect can be rejected by a first rejection apparatus 19 as described below so as not to be bonded to the optical display unit W.

(5) Step of Bonding Release Film (S5). After the defect inspecting step (S4), a first release film-bonding apparatus 105 bonds a release film 12a to the first optical member 11 with a first pressure-sensitive adhesive layer 14 interposed therebetween.

Figure 2:
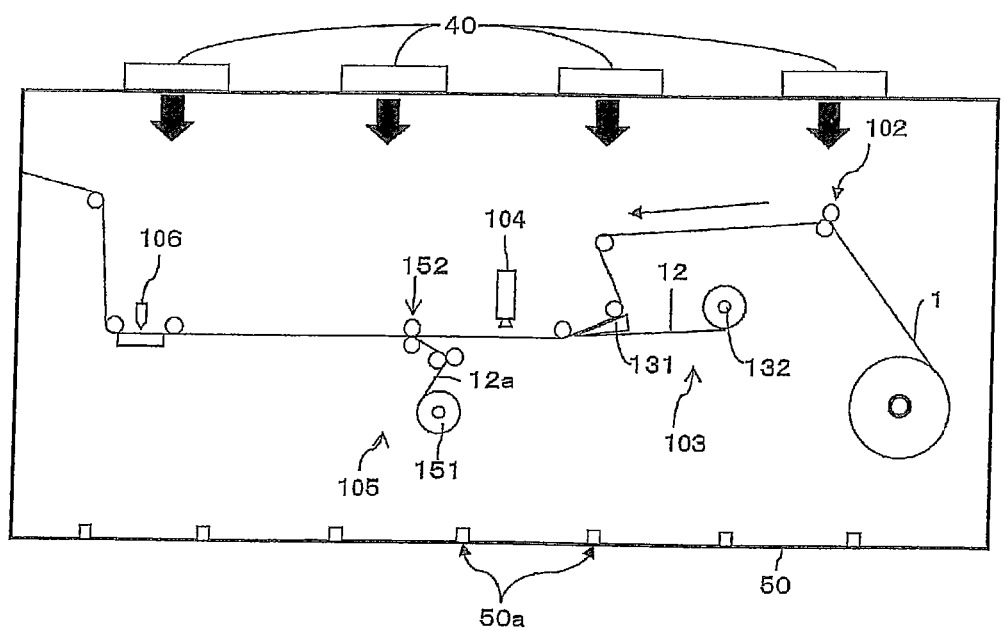
FIG. 2 is a diagram showing an example of the main configuration of the system of Embodiment 1 for manufacturing an optical display device.

After the defect inspecting step (S4), the first release film-bonding apparatus 105 bonds the release film 12a to the first optical member 11 with the first pressure-sensitive adhesive layer 14 interposed therebetween. As shown in FIG. 2, the release film 12a is fed from a roll 151 of the release film 12a, and the release film 12a and the first sheet material 1 are inserted between one or more pairs of rollers 152. The release film 12a is bonded to the first optical member 11 with the first pressure-sensitive adhesive layer 14 interposed therebetween under the action of a certain pressure from the pair of rollers 152.

(6) Cutting Step (S6). After the step (S5) of bonding the release film, a first cutting apparatus 106 cuts the surface protecting member 13, the weak pressure-sensitive adhesive layer 15, the first optical member 11, and the first pressure-sensitive adhesive layer 14, while leaving the release film 12a uncut. Based on the defect position coordinates detected by the first defect inspection, the first cutting apparatus 106 preferably cuts the material into a predetermined size in such a manner that defective portions can be separated. For example, the cutting method may be laser cutting, cutting with a cutter, or any other known cutting method.

(7) Bonding Step (S7). After the cutting step (S6), while a first peeling apparatus 17 peels off the release film 12a, a first bonding apparatus 18 bonds the first optical member 11, which is separated from the release film 12a, to an optical display unit W with the first pressure-sensitive adhesive layer 14 interposed therebetween.

The peeling mechanism 171 of the first peeling apparatus has a sharp-ended knife edge portion and is configured so that the release film 12a can be peeled off by taking up the release film 12a with the knife edge portion and turning the direction of the feeding and that the first sheet material 1 peeled off from the release film 12a can be fed to the surface of the optical display unit W. The peeled release film 12a is wound on a roll 172.

Figure 3:
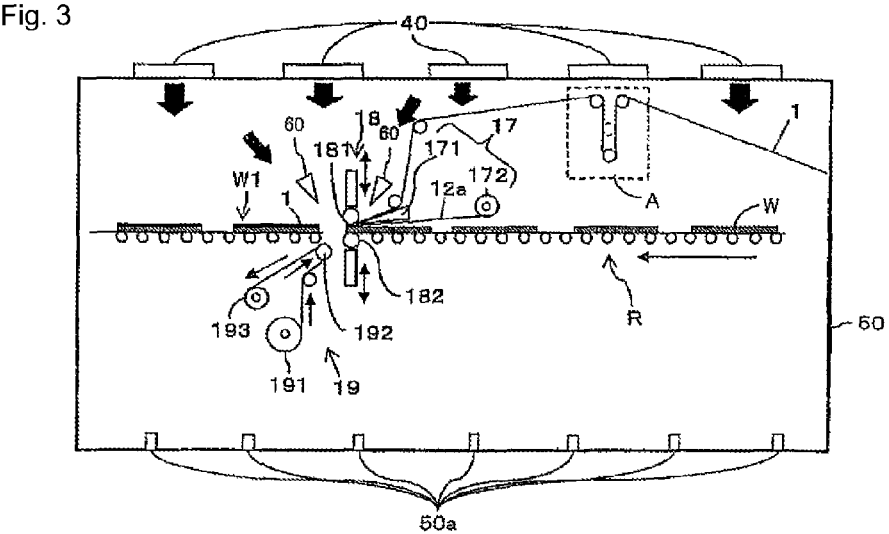
FIG. 3 is a diagram showing an example of the main configuration of the system of Embodiment 1 for manufacturing an optical display device.
Figure 7:
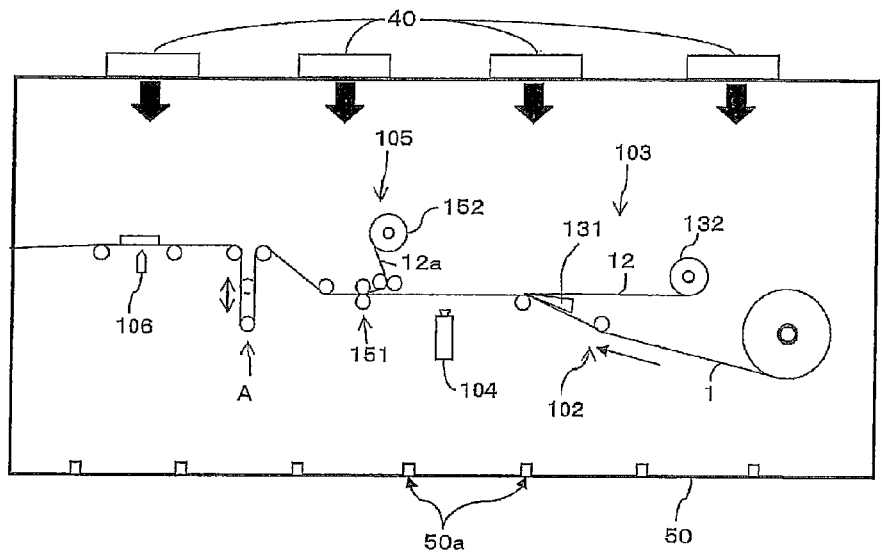
FIG. 7 is a diagram showing an example of the main configuration of the system of Embodiment 2 for manufacturing an optical display device.

As shown in FIG. 3 or 7, the bonding process includes bringing a press roller 181 into contact with the surface of the surface protecting member 13, bringing a guide roller 182 into contact with the lower surface of the optical display unit W, and pressing the first sheet material 1 against the surface of the optical display unit W so that the exposed surface (the surface of the first pressure-sensitive adhesive layer 14) of the first optical member 11 separated from the release film is bonded to the surface of the optical display unit W. The press roller 181 and the guide roller 182 may each be an elastic roller (such as a silicone rubber roller) or a metallic roller.

In such a bonding process, the surface of the first optical member 11 to be bonded (the first pressure-sensitive adhesive layer 14) is not exposed until immediately before the bonding, and the exposed surface can be bonded immediately, so that the deposition of foreign substances onto the surface of the first optical member 11 to be bonded can be prevented well.

A description is given below of the first rejection apparatus 19 to reject the first sheet material 1 having any defect. When the first sheet material 1 having a defect is transported to the bonding position, the guide roller 182 moves vertically downward. Subsequently, a roller 192 over which a pressure-sensitive adhesive tape 191 is looped moves to the regular position of the guide roller 182. The press roller 181 is allowed to move vertically downward to press the defect-containing first sheet material 1 against the pressure-sensitive adhesive tape 191. Thus, the defect-containing first sheet material 1 is bonded to the pressure-sensitive adhesive tape 191 and wound on a roller 193 together with the pressure-sensitive adhesive tape 191.

(8) Step of Cleaning Optical Display Unit (S8). The surface of the optical display unit W is previously cleaned using a polishing cleaning apparatus and a water cleaning apparatus. The cleaned optical display unit W is transported to the first bonding apparatus by feed means R. For example, the feed means R includes a plurality of feed rollers, a feed direction-switching mechanism, a rotary drive, a sensor, a controller, and so on.

The first optical member 11 is bonded to one side of the optical display unit W through the above steps. A description is given below of manufacturing steps for bonding a second optical member 21 to the other side. If a certain step is the same as described above, such a step will be described briefly.

(9) Step of Providing Second Material Roll (S9). A second roll of a second long sheet material 2 is provided. The second sheet material 2 has a laminated structure as shown in FIG. 6. The second sheet material 2 includes a second optical member 21, a release film 22 and a surface protecting member 23. The second optical member 21 includes a second polarizer 21a, a third polarizer-protecting film 21b provided on one side thereof with an adhesive layer (not shown) interposed therebetween, and a fourth polarizer-protecting film 21c provided on the other side thereof with an adhesive layer (not shown) interposed therebetween.

(10) Feeding Step (S10). The second sheet material 2 is fed to the downstream side from the second roll provided and placed. A second feeder 202 to feed the second sheet material 2 has the same components as the first feeder 102, but the second sheet material 2 is fed in a direction opposite to the feed direction of the first sheet material 1.

(11) Step of Removing Release Film (S11)

A second pre-inspection peeling apparatus peels off the release film 22 from the second sheet material 2 being fed. The second pre-inspection peeling apparatus includes: a peeling mechanism 231 that is the same as described above and has a knife edge portion with which the release film 22 is taken up and peeled off; and a roll 232 on which the release film 22 being peeled off is wound.

(12) Step of Inspecting Defects (S12). After the step (S11) of removing the release film, the second sheet material 2 is inspected for defects using a second defect inspection apparatus 204. The second defect inspection apparatus 204 has the same components as the first defect inspection apparatus 104.

Figure 4:
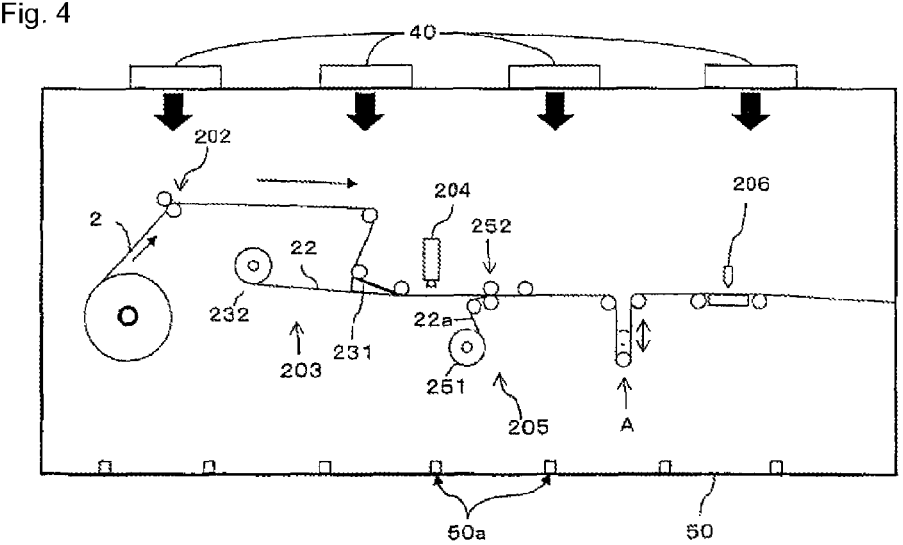
FIG. 4 is a diagram showing an example of the main configuration of the system of Embodiment 1 for manufacturing an optical display device.

(13) Step of Bonding Release Film (S13). After the second defect inspecting step (S12), a second release film-bonding apparatus 205 bonds a release film 22a to the second optical member 21 with a second pressure-sensitive adhesive layer 24 interposed therebetween. As shown in FIG. 4, the second release film-bonding apparatus 205 feeds the release film 22a from a roll 251 of the release film 22a, holds the release film 22a and the second sheet material 2 between one or more pairs of rollers 252, and bonds the release film 22a to the second optical member 21 with the second pressure-sensitive adhesive layer 24 interposed therebetween.

(14) Cutting Step (S14). After the step (S13) of bonding the release film, a second cutting apparatus 206 cuts the surface protecting member 23, the weak pressure-sensitive adhesive layer 25, the second optical member 21, and the second pressure-sensitive adhesive layer 24, while leaving the release film 22a uncut. The second cutting apparatus 206 has the same components as the first cutting apparatus 106.

(15) Bonding Step (S15). While a second peeling apparatus is used to remove the second release film 22a, a second bonding apparatus 28 is used to bond the exposed surface of the second optical member 21 (the surface of the second pressure-sensitive adhesive layer 24, which is exposed by removing the second release film 22a) to the opposite surface of the optical display unit W1 from the surface to which the first optical member 11 is bonded.

The peeling mechanism 271 of the second peeling apparatus has a sharp-ended knife edge portion and is configured so that the release film 22a can be peeled off by taking up the release film 22a with the knife edge portion and turning the direction of the feeding and that the second sheet material 2 separated from the release film 22a can be fed to the surface of the optical display unit W1. The peeled release film 22a is wound on a roll 272.

Figure 5:
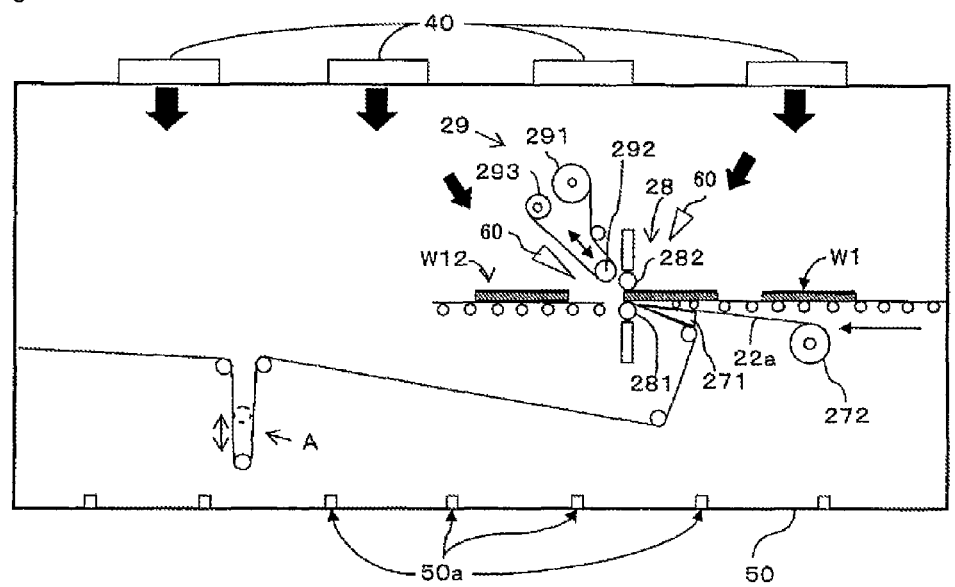
FIG. 5 is a diagram showing an example of the main configuration of the system of Embodiment 1 for manufacturing an optical display device.
Figure 6:
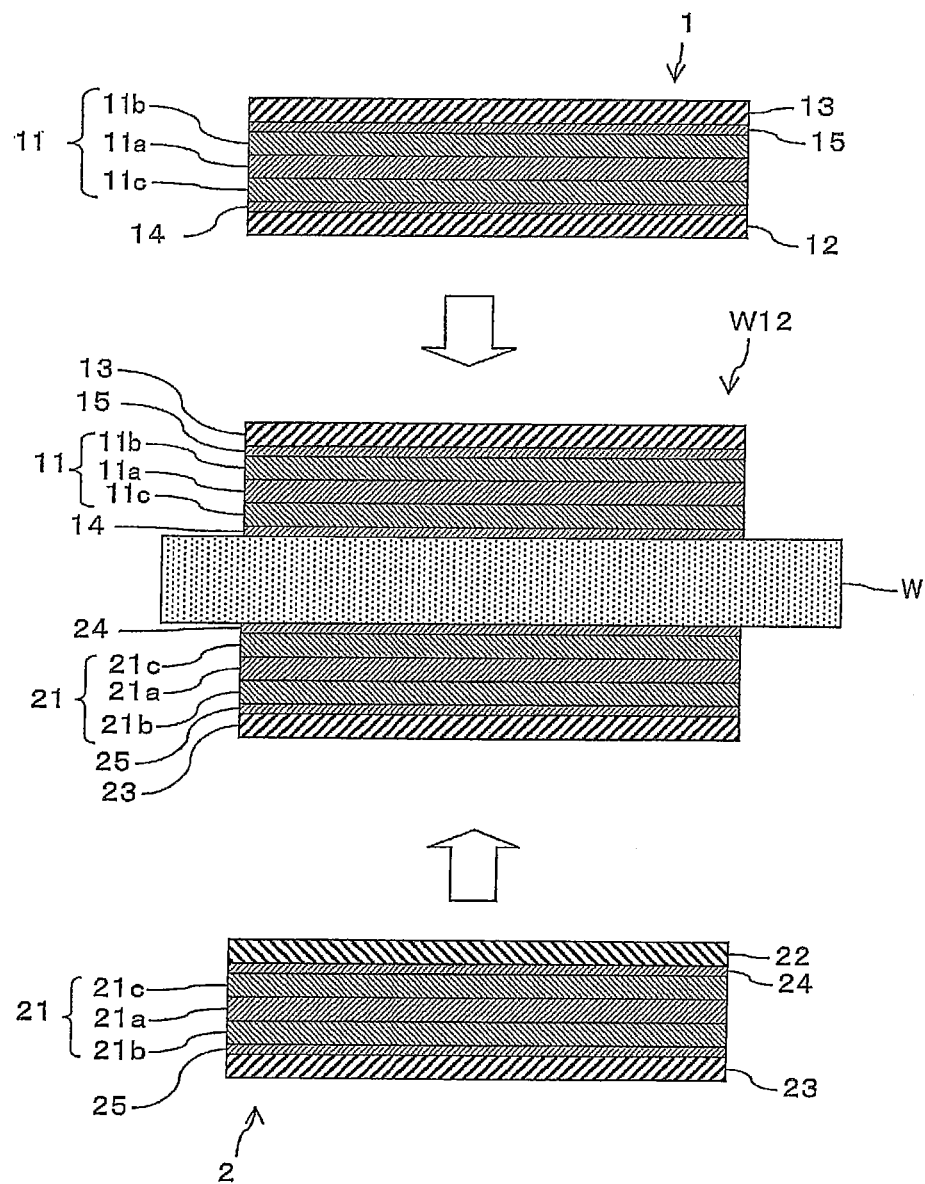
FIG. 6 is a schematic cross-sectional view of an example of the optical display device in Embodiment 1.

As shown in FIG. 5, the bonding process includes bringing a press roller 281 into contact with the surface of the surface protecting member 23, bringing a guide roller 282 into contact with the upper surface of the optical display unit W1, and pressing the second sheet material 2 against the surface of the optical display unit W1 so that the exposed surface (the surface of the second pressure-sensitive adhesive layer 24) of the second optical member 21 separated from the release film is bonded to the surface of the optical display unit W1. Thus, the surface of the second optical member 21 to be bonded (the second pressure-sensitive adhesive layer 24) is not exposed until immediately before the bonding, and the exposed surface can be bonded immediately, so that the deposition of foreign substances onto the surface of the second optical member 21 to be bonded can be prevented well.

A description is given below of a second rejection apparatus 29 to reject the second sheet material 2 having any defect. When the second sheet material 2 having a defect is transported to the bonding position, the guide roller 282 moves vertically upward. Subsequently, a roller 292 over which a pressure-sensitive adhesive tape 291 is looped moves to the regular position of the guide roller 282. The press roller 281 is allowed to move vertically upward to press the defect-containing second sheet material 2 against the pressure-sensitive adhesive tape 291. Thus, the defect-containing second sheet material 2 is bonded to the pressure-sensitive adhesive tape 291 and wound on a roller 293 together with the pressure-sensitive adhesive tape 291.

An optical display device W12 including the optical unit W and the optical members (first and second optical members 11 and 21) bonded to both sides thereof is manufactured through the above manufacturing steps.

According to Embodiment 1, the step of bonding the first optical member 11 and the steps of bonding the second optical member 21 are performed in a continuous manufacturing line, so that the optical display device can be manufactured in a satisfactory manner. In particular, each of the above steps is performed in an isolation structure isolated from a factory environment, so that the optical member can be bonded to the optical display unit in an environment with ensured cleanliness. In addition, before and/or during the bonding step, airflow of an ionized gas is provided to act on the optical display unit W, which is electrostatically charged by the feeding in contact with the feed means R (feed rollers), so that static electricity is sufficiently removed from the optical display unit W. Thus, the deposition of dust or dirt onto the surface of the optical display unit W to be bonded and the electrostatic destruction of the optical display unit W can be prevented well, so that an optical display device of high quality can be manufactured.

Embodiment 2

The manufacturing method and system of Embodiment 1 include first bonding the first sheet material 1 (first optical member 11) to the upper surface of the optical display unit W (the optical display unit surface not brought into contact with the feed means R) and then bonding the second sheet material 2 (second optical member 21) to the lower surface of the optical display unit W1 (the optical display unit surface brought into contact with the feed means R). Embodiment 2 described below includes first bonding the first sheet material 1 (first optical member 11) to the lower surface of the optical display unit W (the optical display unit surface brought into contact with the feed means R) and then bonding the second sheet material 2 (second optical member 21) to the upper surface of the optical display unit W1 (the optical display unit surface not brought into contact with the feed means R). FIGS. 7 to 10 are diagrams showing an example of the main configuration of the manufacturing system.

The isolation structure 50, the air blower 40 and the ionizer 60 are configured in the same manner as in Embodiment 1.

Referring to FIG. 7, the first sheet material 1 is fed with the release film 12 facing upward. The first pre-inspection peeling apparatus 103, the first defect inspection apparatus 104, the first release film-bonding apparatus 105, and the first cutting apparatus 106 each have the same configuration and function as described above, but they are arranged in a different manner according to the position of the release film 12.

Figure 8:
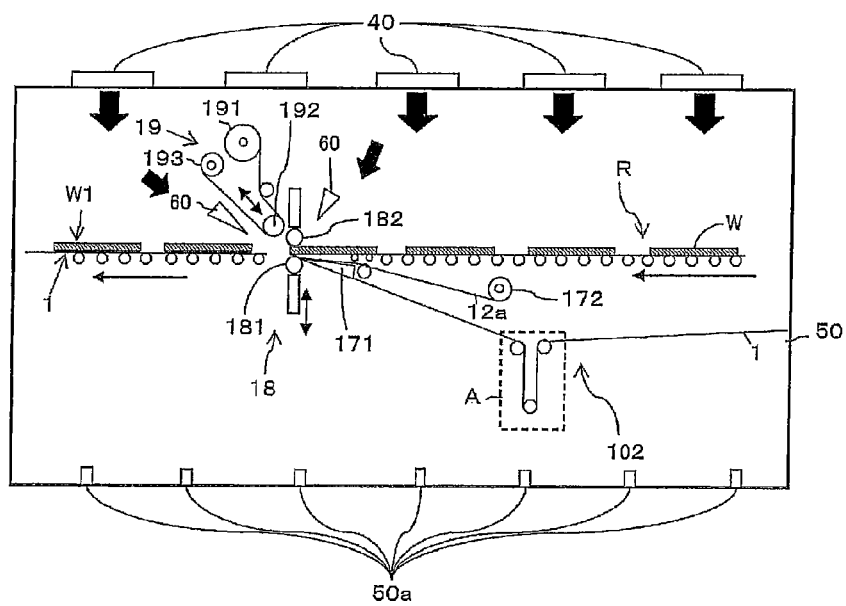
FIG. 8 is a diagram showing an example of the main configuration of the system of Embodiment 2 for manufacturing an optical display device.

Referring to FIG. 8, the first peeling apparatus 17, the first bonding apparatus 18, and the first rejection apparatus 19 also each have the same configuration and function as described above, but they are arranged in a different manner according to the position of the release film 12a. Thus, the first sheet material 1 is fed under the optical display unit W, so that the airflow can easily act on the optical display unit W and that the cleanliness of the upper surface of the optical display unit W can be kept high. The effect of the airflow is relatively small around the first sheet material 1 fed under the optical display unit W. However, the release film 12a is provided on the upper side of the first sheet material 1, and therefore, even when suspended matter such as dust or dirt is deposited on the release film 12a, the release film 12a is peeled off immediately before the bonding, which can eliminate the problem of the deposition of foreign manner onto the surface to be bonded.

Figure 9:
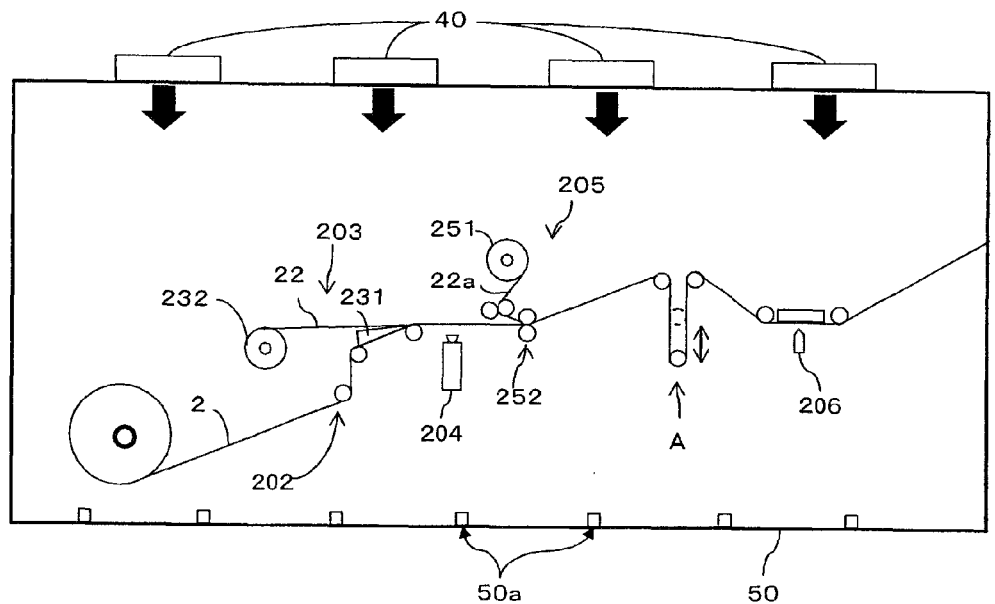
FIG. 9 is a diagram showing an example of the main configuration of the system of Embodiment 2 for manufacturing an optical display device.

Referring to FIG. 9, the second sheet material 2 is fed with the release film 22 facing upward. The second pre-inspection peeling apparatus 203, the second defect inspection apparatus 204, the second release film-bonding apparatus 205, and the second cutting apparatus 206 each have the same configuration and function as described above, but they are arranged in a different manner according to the position of the release film 22.

Figure 10:
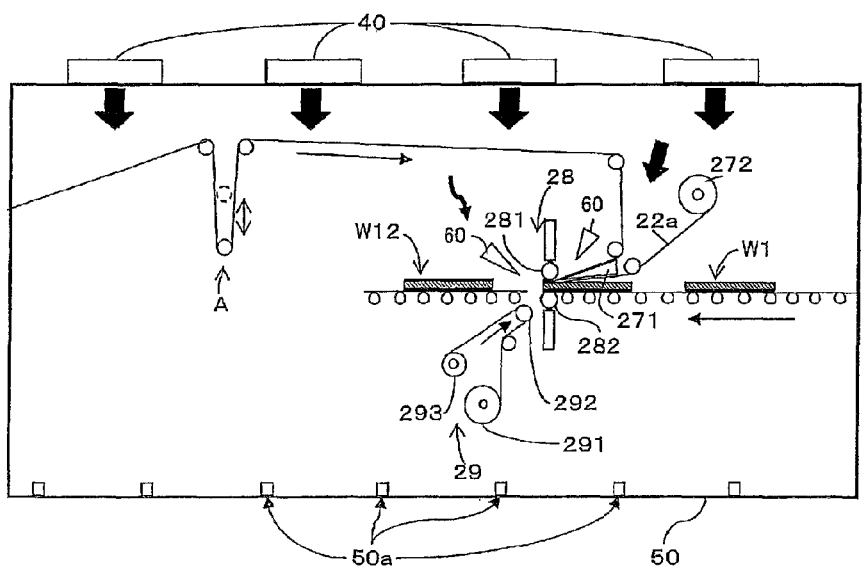
FIG. 10 is a diagram showing an example of the main configuration of the system of Embodiment 2 for manufacturing an optical display device.

Referring to FIG. 10, the second peeling apparatus 27, the second bonding apparatus 28, and the second rejection apparatus 29 also each have the same configuration and function as described above, but they are arranged in a different manner according to the position of the release film 22a. In this arrangement, the airflow can be allowed to act on the upper side of the optical display unit W1 to keep the cleanliness high. The cleanliness around the second sheet material 2 can also be kept high.

According to Embodiment 2, the optical member is bonded to the optical display unit surface brought into contact with feed rollers earlier than to the optical display unit surface not brought into contact with a plurality of feed rollers of the feed means R, so that the time of contact between the optical display unit and the feed rollers can be reduced, which can reduce the chances of deposition of foreign matter onto the optical display unit surface brought into contact with the feed rollers. In addition, the optical member is first bonded to the optical display unit surface brought into contact with the feed rollers, so that the time of direct contact between the optical display unit surface and the feed rollers can be reduced. As a result, the electrostatic charge of the optical display unit caused by the friction between the optical display unit and the feed rollers can be suppressed, so that electrostatic destruction can be prevented well.

The invention claimed is:

1. A method for manufacturing an optical display device comprising an optical display unit and two optical members of a predetermined size bonded to the optical display unit, which comprises:
    a feeding step for feeding a long sheet material from a roll of the long sheet material to a bonding position while an airflow is blown from an upper side to a lower side of the bonding position, wherein the long sheet material includes an optical member and a release film bonded thereto, and the long sheet material is fed with the release film facing upward or downward;
    an optical display unit feeding step for feeding the optical display unit to the bonding position while allowing the airflow to act on the optical display unit in an environment with the airflow blown from the upper side to the lower side, wherein the optical display unit is fed in a position that does not vertically overlap with a position where the roll is placed, and a surface of the optical display unit to be bonded faces upward or downward; and
    a bonding step for peeling off a predetermined-size cut piece of the optical member from the release film left uncut and bonding the cut piece of the optical member to an upper or lower surface of the optical display unit in the environment with the airflow.

2. The method of claim 1, wherein the airflow is comprised of an ionized gas at least a position where one of the optical members is bonded to the optical display unit, and
    the airflow of the ionized gas is supplied to flow on the optical display unit that is being fed in contact with feed means.

3. The method of claim 1, wherein the bonding step is the step for bonding a surface of one of the optical members to be bonded to the optical display unit while peeling off a release film from a sheet material that includes the optical member and the release film bonded thereto, wherein the surface of the optical member to be bonded is exposed by peeling off the release film from the sheet material.

4. The method according to claim 1, wherein, in the bonding step, the optical member is bonded to a first optical display unit surface, which is brought into contact with the feed means, earlier than to a second optical display unit surface, which is not brought into contact with the feed means.

* * * * *